United States Patent
Al-Awami et al.

(10) Patent No.: US 10,843,586 B2
(45) Date of Patent: Nov. 24, 2020

(54) OPTIMAL DISPATCH OF ELECTRIC VEHICLES PERFORMING V2G REGULATION

(71) Applicant: King Fahd University of Petroleum and Minerals, Dhahran (SA)

(72) Inventors: Ali T. Al-Awami, Dhahran (SA); Eric V. Sortomme, Dhahran (SA); Ahmed Saleem, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 84 days.

(21) Appl. No.: 15/989,882

(22) Filed: May 25, 2018

(65) Prior Publication Data

US 2019/0359065 A1    Nov. 28, 2019

(51) Int. Cl.
*B60L 55/00* (2019.01)
*H02J 7/00* (2006.01)
*G05D 1/02* (2020.01)
*G05B 15/02* (2006.01)

(52) U.S. Cl.
CPC ............. *B60L 55/00* (2019.02); *G05B 15/02* (2013.01); *G05D 1/0291* (2013.01); *H02J 7/0027* (2013.01); *G05D 2201/0213* (2013.01)

(58) Field of Classification Search
CPC ..................................................... B60L 55/00
USPC ......................................................... 320/109
See application file for complete search history.

(56) References Cited

U.S. PATENT DOCUMENTS

| 8,849,687 | B2 | 9/2014 | Hakim et al. |
| 9,054,532 | B2* | 6/2015 | Sortomme ............... H02J 7/00 |
| 9,283,862 | B2* | 3/2016 | Bridges ................ B60L 11/184 |
| 2013/0197710 | A1* | 8/2013 | Hansen ................ H02J 7/0013 700/297 |
| 2016/0247106 | A1 | 8/2016 | Dalloro et al. |

OTHER PUBLICATIONS

Sortomme, E., et al. ; Intelligent Dispatch of Electric Vehicles Performing Vehicle-to-Grid Regulation ; 2012 ; pp. 1, 2, 4, 5, 6 ; https://dokumen.tips/documents/ieee-2012-ieee-international-electric-vehicle-conference-ievc-greenville-5857b52d4eb1b.html.

(Continued)

*Primary Examiner* — Jerry D Robbins
(74) *Attorney, Agent, or Firm* — Oblon, McClelland, Maier & Neustadt, L.L.P.

(57) ABSTRACT

A system, method, and computer-readable storage medium for charging management for electric vehicles performing vehicle-to-grid regulation are presented. The system includes an aggregator that communicates with the electric vehicles according to a dispatch strategy to switch charging with electric power from the electric grid. The aggregator that aggregates and manages charging of a set of electric vehicles associated with an electric grid. A dispatch controller controls switching of at least a subset of electric vehicles of the set of electric vehicles between an ON state and an OFF state at a given time by sending binary charge commands to the subset of batteries, in a manner that change of charging rate of individual batteries is minimized while maintaining charging fairness among the respective electric vehicles.

13 Claims, 9 Drawing Sheets

(56) References Cited

OTHER PUBLICATIONS

Deconinck, Geert, et al. ; Combining Market-Based Control with Distribution Grid Constraints when Coordinating Electric Vehicle Charging ; Dec. 2015 ; pp. 1, 2, 11 ; http://www.sciencedirect.com/science/article/pii/S2095809916300261.
Ardakanian, Omid, et al. ; Real-Time Distributed Control for Smart Electric Vehicle Chargers: From a Static to a Dynamic Study ; 2013 ; pp. 1, 2 ; https://pdfs.semanticscholar.org/8821/49f228fc9508.
Vagropoulos, Stylianos I., et al. ; Real-Time Charging Management Framework for Electric Vehicle Aggregators in a Market Environment ; Mar. 2016.
Sortomme, Eric, et al. ; Optimal Charging Strategies for Unidirectional Vehicle-to-Grid ; Mar. 2011.
Sortomme, Eric, et al ; Optimal Combined Bidding of Vehicle-to-Grid Ancillary Services ; Mar. 2013.
Sortomme, Eric, et al ; Optimal Scheduling of Vehicle-to-Grid Energy and Ancillary Services ; Mar. 2012.
Saleem, Ahmed, et al ; Communication-aware Charging Management Framework for Electric Vehicles Performing V2G Regulation.

\* cited by examiner

OPTIMAL DISPATCH OF ELECTRIC VEHICLES PERFORMING V2G REGULATION

STATEMENT OF ACKNOWLEDGEMENT

The authors would like to acknowledge the support provided by the Deanship of Scientific Research (DSR) at King Fand University of Petroleum & Minerals (KFUPM), Dhahran, Saudi Arabia, for supporting this work under project no. RG1404-1 & -2.

BACKGROUND

Field of the Invention

The present disclosure relates generally to optimal dispatch method for electric vehicles performing discrete unidirectional frequency regulation.

Description of the Related Art

The electric power industry supplies electric power to meet demand. Supplying electric power involves generation, transmission, and distribution of electricity. In order to support the continuous flow of electricity, additional services and functions are provided, referred to as ancillary services. Ancillary services generally include frequency regulation and peak shaving.

The public power grid is evolving. The public power grid is diversifying to integrate renewable energy resources from sources such as wind and solar farms. Power from wind and solar farms is generated based on natural conditions such as amount of wind and sun, which can vary throughout a day. The timing of power generated from wind and solar farms may not match timing of demand for electricity, potentially resulting in times where excess energy is generated. Thus, a problem that needs to be considered when integrating renewable energy resources is that excess energy generated from wind and solar farms may go to waste if there is nowhere to store the excess energy. A solution has been to store electricity in energy storage systems, such as in a cluster of batteries as a reservoir for electricity.

In addition to adaptation of renewable energy, the power grid is becoming smarter. The term smart grid generally refers to using computer-based control, automation, and communication in the supply of electric power. The computer-based control involves a variety of energy measures including smart meters, smart appliances, and other energy efficiency resources. The development of smart grid technologies has expanded the types of equipment that can be used to provide ancillary services. Electric Vehicles (EVs) are a type of equipment that are being considered for providing ancillary services.

The number of electric vehicles (EVs), and in particular plug-in electric vehicles, on the road has been steadily increasing. A plug-in electric vehicle (PEV) is any motor vehicle that can be recharged from an external source of electricity, i.e., the electric grid, and the electricity stored in the rechargeable battery packs drives or contributes to drive wheels for propulsion. Other electric vehicles include all-electric or battery electric vehicles, plug-in hybrid vehicles. Benefits of plug-in electric vehicles include that they have lower operating and maintenance costs, and produce little or no local air pollution. Plug-in electric vehicles reduce dependence on petroleum. Subsequently, reasons for the growth in electric vehicles include a desire for environmental sustainability and energy security. However, the electric load for charging an electric vehicle can be nearly as great as the load for a house. The growth in demand for electricity projected by the increasing use of EVs may be seen as problematic for energy grids. Thus, the electric power industry is interested in manipulating charging so that EVs can draw power when it is best for the grid while also ensuring the customer has a full battery when needed. An approach that is being considered is to schedule EVs for ancillary services.

Electric vehicles (EVs) can support the integration of renewable energy resources (RES) if their charging is coordinated properly. See Ali T. Al-Awami and E. Sortomme, "Coordinating Vehicle-to-Grid Services with Energy Trading," IEEE Transactions on Smart Grid, vol. 3, no. 1, pp. 453-462, 2012, herein incorporated in by reference in its entirety. There are limitations, however, to EV adoption due to EV's high initial costs and the immaturity of public charging systems.

A technique that promises to convert EVs from potentially being problematic loads into distributed energy resources is Vehicle-to-Grid (V2G). V2G is the provision of energy and ancillary services, like frequency regulation and peak shaving, from an EV to the electric grid. See W. Kempton and J. Tomic, "Vehicle-to-grid power implementation: From stabilizing the grid to supporting large-scale renewable energy," Journal of Power Sources, vol. 144, no. 1, pp. 280-294, 1 Jun. 2005; W. Kempton and J. Tomic, "Vehicle-to-grid power fundamentals: Calculating capacity and net revenue," Journal of Power Sources, vol. 144, no. 1, pp. 268-279, 1 Jun. 2005, herein incorporated by reference in their entirety. It can also help EV owners generate value while helping the utilities they are connected to. V2G capable EVs can provide many services to the grid such as peak shaving, frequency regulation and spinning and non-spinning reserves. It has been shown in previous works that the most valuable service that EVs can offer is often frequency regulation, though this depends on the market design. See J. Tomic and W. Kempton, "Using fleets of electric-drive vehicles for grid support," Journal of Power Sources, vol. 168, no. 2, pp. 459-468, 1 Jun. 2007; Joe H. Chow, Robert deMello, Kwok W. Cheung, "Electricity Market Design: An Integrated Approach to Reliability Assurance", Invited Paper, IEEE Proceeding (Special Issue on Power Technology & Policy: Forty Years after the 1965 Blackout), vol. 93, no. 11, pp. 1956-1969, November 2005, herein incorporated by reference in their entirety. However, because a single EV does not have adequate capacity to participate in wholesale electricity markets, aggregators are required to combine the capacities of many EVs. See N. Rotering and M. Ilic, "Optimal Charge Control of Plug-In Hybrid Electric Vehicles in Deregulated Electricity Markets," IEEE Transactions on Power Systems, vol. 26, no. 3, pp. 1021-1029, 2011; AeroVirnonment EV Solutions, "Electric Vehicle Smart Charging Station," 2010, [Online]. Available: http://evsolutions.avinc.com/uploads/products/2_AV_EVSE-LS_B2B_061010_retail_smart.pdf [Accessed: Oct. 14, 2011], herein incorporated by reference in their entirety. V2G can be unidirectional or bidirectional. Unidirectional V2G is preferred, i.e., power be allowed to flow from the grid to the EV, and EV battery discharge to support the grid is not allowed. See N. Rahbari-Asr, M. Y. Chow, J. Chen and R. Deng, "Distributed Real-Time Pricing Control for Large-Scale Unidirectional V2G With Multiple Energy Suppliers," in IEEE Transactions on Industrial Informatics, vol. 12, no. 5, pp. 1953-1962, October 2016; S. I. Vagropoulos, D. K. Kyriazidis and A. G. Bakirtzis, "Real- Time Charging Management Framework for Electric Vehicle Aggregators in a Market Environment," in IEEE Transactions on Smart Grid, vol. 7, no. 2, pp. 948-957, March 2016, herein incorporated by reference in their entirety. Unidirectional V2G is more likely to be widely accepted in practice as it has minimal impact on battery degradation, E. Sortomme and M. A. El-Sharkawi, "Optimal Charging Strategies for Unidirectional Vehicle-to-Grid," *IEEE Transactions on Smart Grid*, vol. 2, no. 1, pp. 131-138, 2011; E. Sortomme and M. A. El-Sharkawi, "Optimal Combined Bidding of Vehicle-to-Grid Ancillary Services," *IEEE Transactions on Smart Grid*, vol. 3, no. 1, pp. 70-79, 2012, herein incorporated by reference in their entirety.

Because a single EV does not have adequate capacity to participate in wholesale energy markets, electric vehicle aggregators (EVAs) combine the capacities of many EVs. An EVA may be a utility managing EVs on its distribution system, or a third party operating a virtual power plant. An EVA is a market participant that bids the combined capacities of the EVs into the appropriate market. As a market participant, the EVA is required to submit energy schedules to the wholesale energy market and capacity schedules, e.g. frequency regulation and reserves, to the corresponding ancillary service markets. These schedules are submitted to the concerned markets on the day ahead (DA). In real-time (RT), if no ancillary service is requested by the system operator, the EVA is expected to abide by its own energy schedules. However, if an ancillary service, e.g. frequency regulation, is requested, the EVA is expected to follow the ancillary service command signal. This is performed by moving some or all EVs above or below their scheduled charging rates.

In order to accommodate ancillary services, the EVA needs DA and RT charge management strategies. The DA management strategy concerns the preparation of optimal schedules of energy and regulation capacities that the EVA sends to the corresponding markets on the day ahead. Then, the RT management strategy concerns EV dispatching and includes deciding which EVs should be moved from their DA scheduled charging rates and how much charging rates should be moved. Since typically in RT, the EVA receives a regulation signal update once every 2-6 seconds, the RT strategy needs to be computationally efficient. In addition, the RT strategy must ensure meeting the regulation signal while considering EV characteristics and EV owners' preferences.

A number of algorithms on day-ahead (DA) optimization of V2G scheduling from the EVA perspective have been presented in the literature. See N. Rotering; E. Sortomme and M. A. El-Sharkawi, 2012; S. Han, S. Han and K. Sezaki, "Development of an Optimal Vehicle-to-Grid Aggregator for Frequency Regulation," in *IEEE Transactions on Smart Grid*, vol. 1, no. 1, pp. 65-72, June 2010; Sortomme, E. and El-Sharkawi, M. A., "Optimal Scheduling of Vehicle-to-Grid Energy and Ancillary Services," in *Smart Grid, IEEE Transactions on*, vol. 3, no. 1, pp. 351-359, March 2012 ("E. Sortomme and M. A. El-Sharkawi, March 2012"), herein incorporated by reference in their entirety. The literature has primarily focused on determining the most profitable hourly energy and regulation capacities to schedule. An aggregator performing unidirectional regulation of an EV fleet was considered in E. al et Sortomme, 2011, and expanded in E. Sortomme M and A. El-Sharkawi March 2012, to include spinning reserves. The objective was to optimize the EVs' charging schedules, or preferred operating points (POP), and capacity bids in regulation and reserves markets in a way that maximizes the aggregator's profits while satisfying the EV constraints. Both works developed incremental dispatch methods in the context of optimal schedules. That is, it was assumed that the aggregator would send dispatch signals to all participating EVs in order to respond to regulation/reserve deployment commands requested by the system operator. A similar approach was presented in E. Sortomme et al., 2012, for the bidirectional V2G case using incremental dispatch. A major issue with incremental dispatch, also called droop-based dispatch, is that the charging stations required for incremental power changes are more expensive than the simpler charging stations that accept on/off commands only. This is because additional hardware is needed to modulate charge rates continuously. Also, standard charging stations commercially available today do not support the communication requirements needed for continuous modulation of charge rates. See AeroVimonnent EV Solutions. Another issue is that a new dispatch signal needs to be sent to every EV participating in V2G at every regulation command instance, which has a high resolution of 2-6 seconds.

More recent works on EV scheduling addressed a variety of additional considerations for V2G. In Ansari, M.; Al-Awami, A. T.; Sortomme, E.; Abido, M. A., "Coordinated Bidding of Ancillary Services for Vehicle-to-Grid Using Fuzzy Optimization," in *Smart Grid, IEEE Transactions on*, vol. 6, no. 1, pp. 261-270, January 2015, herein incorporated by reference in its entirety, the benefits of coordinated bidding of ancillary services for unidirectional V2G were investigated while considering market uncertainties modeled using fuzzy sets. The work in Mohsenian-Rad, H.; Ghamkhari, M., "Optimal Charging of Electric Vehicles With Uncertain Departure Times: A Closed-Form Solution," in *Smart Grid, IEEE Transactions on*, vol. 6, no. 2, pp. 940-942, March 2015, herein incorporated by reference in its entirety, proposed a closed-form solution with the aim of optimally scheduling time-shiftable loads with uncertainties in their deadlines. A centralized scheduling system using realistic vehicular mobility/parking patterns for EVs located at individual parking lots was proposed in Kuran, M. S.; Viana, A. C.; Iannone, L.; Kofman, D.; Mermoud, G.; Vasseur, J. P., "A Smart Parking Lot Management System for Scheduling the Recharging of Electric Vehicles," in *Smart Grid, IEEE Transactions on*, vol. 6, no. 6, pp. 2942-2953, November 2015, herein incorporated by reference in their entirety. This EV charging scheduling method focused on individual parking lots. In Aravinthan, V.; Jewell, W., "Controlled Electric Vehicle Charging for Mitigating Impacts on Distribution Assets," in *Smart Grid, IEEE Transactions on*, vol. 6, no. 2, pp. 999-1009, March 2015, herein incorporated by reference in its entirety, a technique is introduced for scheduling EV charging focusing on lessening distribution and transmission assets burdens while ensuring all the vehicles are charged. The utilized methodology consisted of two steps. Depending on day-ahead charging requests, the first step was to optimize the number of vehicles to be charged during each hour. The maximum number of EVs that can be charged is then determined based on operating conditions during the following hour to ensure meeting distribution reliability requirements. In R. Yu, W. Zhong, S. Xie, C. Yuen, S. Gjessing and Y. Zhang, "Balancing Power Demand Through EV Mobility in Vehicle-to-Grid Mobile Energy Networks," in *IEEE Transactions on Industrial Informatics*, vol. 12, no. 1, pp. 79-90, February 2016, herein incorporated by reference in its entirety, the focus was on the exploration of EV mobility and how it impacts demand response management across V2G energy networks.

Recently, a number of works have presented algorithms for managing EV charging that are suitable for RT adoption. RT charge management mechanisms have been proposed. See W. Su and M. Y. Chow, "Performance Evaluation of an EDA-Based Large-Scale Plug-In Hybrid Electric Vehicle Charging Algorithm," in *IEEE Transactions on Smart Grid*, vol. 3, no. 1, pp. 308-315, March 2012; A. Mohamed, V. Salehi, T. Ma and O. Mohammed, "Real-Time Energy Management Algorithm for Plug-In Hybrid Electric Vehicle Charging Parks Involving Sustainable Energy," in *IEEE Transactions on Sustainable Energy*, vol. 5, no. 2, pp. 577-586, April 2014; F. J. Soares, P. M. R. Almeinda, and J. A. P. Lopes, "Quasi-real-time management of electric vehicles charging," Electric Power Systems Research, vol. 108, pp. 293-303, March 2014; L. Yang, J. Zhang and H. V. Poor, "Risk-Aware Day-Ahead Scheduling and Real-time Dispatch for Electric Vehicle Charging," in *IEEE Transactions on Smart Grid*, vol. 5, no. 2, pp. 693-702, March 2014; Y. Huang, C. Guo, Y. Ding, L. Wang, B. Zhu, L. Xu, "A multi-period framework for coordinated dispatch of plug-in electric vehicles," Energies vol. 9, no. 5:370, 2016; L. He, C. Li, Y. Cao, Z. Yu and B. Fang, "Synergistic and priority control for electric vehicles power allocation in participating in AGC," 2013 *Chinese Automation Congress*, Changsha, 2013, pp. 81-86, herein incorporated by reference in their entirety. However, provision of regulation services is not considered in W. Su et al., A. Mohamed et al., F. J. Soares et al., L. Yang et al., Y. Huang et al., and market mechanisms are not considered in L. He et al. In S. I. Vagropoulos, a three-stage framework for DA and RT charge management for an EVA providing regulation services is presented. However, this work involves a large number of parameters that need to be set carefully to warrant a successful outcome. In R. Yu et al., the suggested framework employs model predictive control (MPC) to obtain the RT charging set point for each EV. In S. I. Vagropoulos and Ran Wang, Yifan Li, Ping Wang and D. Niyato, "Design of a V2G aggregator to optimize PHEV charging and frequency regulation control," 2013 *IEEE International Conference on Smart Grid Communications (SmartGridComm)*, Vancouver, B C, 2013, pp. 127-132, herein incorporated by reference in its entirety, all participating EVs have to be updated every time a regulation signal is received by the EVA, which increases the communication burden. In R. Wang, P. Wang and G. Xiao, "Two-Stage Mechanism for Massive Electric Vehicle Charging Involving Renewable Energy," in *IEEE Transactions on Vehicular Technology*, vol. 65, no. 6, pp. 4159-4171, June 2016, herein incorporated by reference in its entirety, another framework for DA and RT EV charge management is proposed in the presence of significant renewable penetration. In recognition of the importance of reducing the complexity of the RT stage, this work involves including an additional stage for charging rate compression.

Considerable attention has been paid in the literature for the impact of communication on power system control. This is motivated by the fact that higher communication traffic can result in higher latency, which may have a de-stabilizing effect on the power system. This is especially true for frequency regulation, or load frequency control (LFC), of bulk power systems and microgrids. See V. P. Singh, N. Kishor and P. Samuel, "Load Frequency Control with Communication Topology Changes in Smart Grid," in *IEEE Transactions on Industrial Informatics*, vol. 12, no. 5, pp. 1943-1952, October 2016; A. Bose, "Smart Transmission Grid Applications and Their Supporting Infrastructure," in *IEEE Transactions on Smart Grid*, vol. 1, no. 1, pp. 11-19, June 2010; C. P. Nguyen and A. J. Flueck, "Modeling of communication latency in smart grid," 2011 IEEE Power and Energy Society General Meeting, San Diego, Calif., 2011, pp. 1-7; P. Kansal and A. Bose, "Bandwidth and Latency Requirements for Smart Transmission Grid Applications," in IEEE Transactions on Smart Grid, vol. 3, no. 3, pp. 1344-1352, September 2012; Ş. Sônmez, S. Ayasun and C. O. Nwankpa, "An Exact Method for Computing Delay Margin for Stability of Load Frequency Control Systems With Constant Communication Delays," in IEEE Transactions on Power Systems, vol. 31, no. 1, pp. 370-377, January 2016; S. Liu, X. Wang and P. X. Liu, "Impact of Communication Delays on Secondary Frequency Control in an Islanded Microgrid," in *IEEE Transactions on Industrial Electronics*, vol. 62, no. 4, pp. 2021-2031, April 2015, herein incorporated by reference in their entirety. In addition, the high communication traffic requires communication channels with high bandwidths and gives rise to high communication power consumption. The need for strict latency requirements in smart grids is emphasized in A. Bose. A model for communication latency as applied to the smart grid is introduced in C. P. Nguyen et al. A method is presented in S. Sonmez et al. for estimating the delay margin requirements for the stability of LFC loop. In S Liu et al., the impact of communication delays on LFC of islanded microgrids is studied. In V. P. Singh et al., LFC performance has been examined considering a number of communication network characteristics, such as latency, bandwidth, and change in communication topology.

Recognizing the impact of communication network performance on the smart grid, a few works have presented methods for scheduling EV charging with low dispatch signal traffic. The main focus of Binetti, G.; Davoudi, A.; Naso, D.; Turchiano, B.; Lewis, F. L., "Scalable Real-Time Electric Vehicles Charging With Discrete Charging Rates," in *Smart Grid, IEEE Transactions on*, vol. 6, no. 5, pp. 2211-2220, September 2015, herein incorporated by reference in their entirety, was to provide a valley-filling schedule for typical peak-valley daily residential profiles. It offered a decentralized user-oriented approach designed to satisfy the EV owner while minimizing the variance and peak of the aggregated load profile as desired by the grid operator. However, it does not consider the EVA's perspective. In Rezaei, P.; Frolik, J.; Hines, P. D. H., "Packetized Plug-In Electric Vehicle Charge Management," in Smart Grid, IEEE Transactions on, vol. 5, no. 2, pp. 642-650, March 2014, herein incorporated by reference in their entirety, another decentralized approach to manage charging for valley-filling is put forward. The works presented in Binetti et al. and Rezaei et al. did not tackle the provision of frequency regulation, which is very challenging due to the high resolution of the regulation signals.

In E. Sortomme and K. W. Cheung, "Intelligent Dispatch of Electric Vehicles Performing Vehicle-to-Grid Regulation," *IEEE International Electric Vehicle Conference*, March 2012, pp. 1-6 ("E. Sortomme and K. W. Cheung, March 2012"), herein incorporated by reference in its entirety, a simple discrete algorithm was proposed for an aggregator-driven RT charge dispatch of an EV fleet that provides regulation services. The suggested algorithm used a few heuristic rules to decide on which EVs to be turned ON/OFF in order to meet the regulation signal at reduced dispatch traffic. However, the heuristics do not take into account dispatch traffic optimality and fairness. There are potential gains that can be made through optimizing the EV dispatch to perform regulation and reserves services. If EVs are charged more efficiently, additional savings in the communications bandwidth requirements can be achieved.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
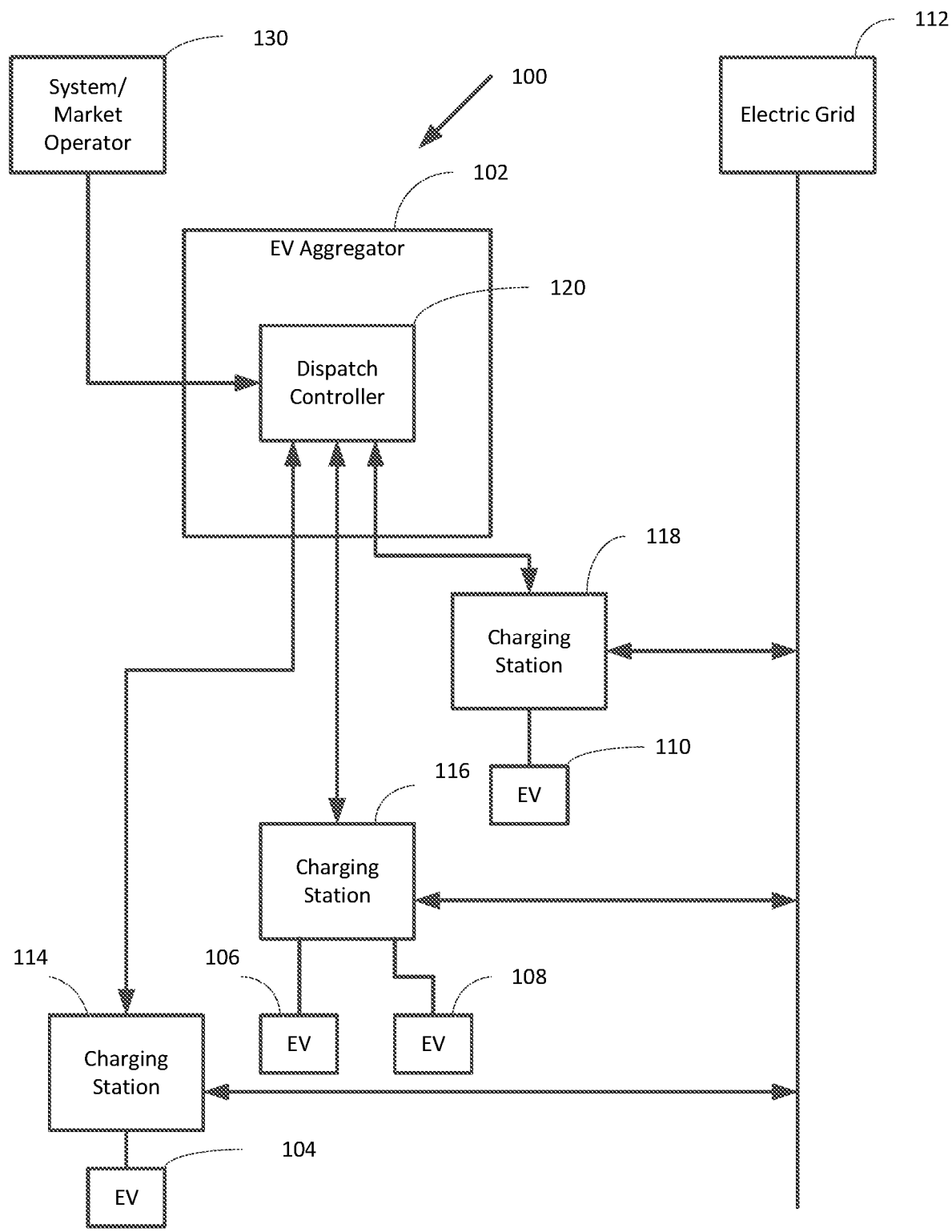
FIG. 1 is a block diagram of a system that can control switching of electric vehicles (EVs) in a vehicle-to-grid (V2G) environment to facilitate controlling power generation in accordance with exemplary aspects of the disclosure.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Referring now to the drawings, wherein like reference numerals designate identical or corresponding parts throughout several views, the following description relates to a system and unidirectional discrete dispatch method for EVs performing unidirectional regulation. The method optimally switches EVs on and off to minimize the total number of communication messages sent to meet the system regulation signal while maintaining fairness in charging EVs with respect to the aggregator's overall schedule.

FIG. 1 is a block diagram of a system that can control switching of electric vehicles (EVs) in a vehicle-to-grid (V2G) environment to facilitate controlling power generation in accordance with exemplary aspects of the disclosure.

The system 100 can include an aggregator 102 that can aggregate, and control charging and switching, of a set of EVs, comprising EV 104, EV 106, EV 108, and EV 110, which can be associated with (e.g., electrically and/or communicatively connected to) an electric grid 112 at various given times. In this disclosure, EVs are a class of vehicles that include plug-in electric vehicles having energy storage systems that can be charged by electricity provided through the electric grid. Typical energy storage systems are rechargeable batteries which include lithium-ion batteries and nickel-metal hydride batteries. Although electric vehicles predominately use lithium-ion batteries, other battery technologies are being developed and are possible. Other battery technologies include solid state lithium-ion batteries, aluminum-ion batteries, lithium-sulfur batteries, and lithium-air batteries. EV batteries may be provided as battery packs. The battery pack for an EV generally provides the overall kilowatt hours and total voltage. The battery pack may include a number of modules, each containing a number of cells per module. The kilowatt hours and voltage of a battery pack depend on the configuration and capacity of each cell. A known battery pack contains interconnected 192 individual cells configured as forty-eight modules, each containing four cells produces 24 kWh at a total voltage of 360 volts. Plug-in electric vehicles are typically provided with a charging port. The electric grid 112 can provide power to the set of EVs and/or other components (e.g., homes, offices, etc.) associated with the electric grid 112. The aggregator component 102 can be associated with (e.g., owned, operated, and/or managed by) an entity (e.g., aggregator), such as, for example, a utility company that can operate the electric grid 112 or a third-party service provider.

The system 100 also can include a plurality of charging stations, including charging station 114, charging station 116, and charging station 118, that can facilitate charging the power storage devices (e.g., rechargeable batteries) of EVs (e.g., 104 through 110) respectively associated with those charging stations (e.g., 114, 116, 118). The plurality of charging stations (e.g., 114, 116, 118) can be associated with (e.g., electrically and/or communicatively connected to) the aggregator 102 and/or EVs (e.g., 104 through 110) respectively associated with (e.g., electrically and/or communicatively connected to) the charging stations (e.g., 114, 116, 118), e.g., at various given times. In accordance with various embodiments, a charging station can be located at a home, an office building, and/or a business that provides EV charging services, or the like. In some embodiments, the set of EVs (e.g., 104 through 110) and/or the plurality of charging stations (e.g., 114, 116, 118) can be associated with (e.g., via respective owners or operators of the EVs and/or charging stations) subscriptions with the entity (e.g., aggregator) associated with the aggregator 102.

The aggregator 102 makes a profit by providing ancillary services to electricity markets. As a market participant, the aggregator 102 attempts to set up schedules such that its profits are maximized. Market participants submit their bids for a specific period to a system/market operator 130 ahead of time. The system/market operator 130 runs a market clearing mechanism for a specific time and determines the winning participants. The system/market operator 130 sends the market clearing prices and cleared capacities to the aggregator 102.

The aggregator 102 can include a dispatch controller 120 that can control switching (e.g., automatically and/or dynamically) of respective EVs (e.g., 104 through 110) associated with the electric grid 112 between an on state (e.g., charging state) and an off state (e.g., not-charging state) at desired times to facilitate regulating power generation by the electric grid 112, including regulating power generation in relation to varying load demands on the electric grid 112, and providing electrical power to the set of EVs (e.g., 104 through 110) to charge the respective power components of the EVs (e.g., 104 through 110). The dispatch controller 120 can switch charging states of the EVs (e.g., 104 through 110) between the on state and the off state to make the discretized regulation signal of the aggregate of the EVs (e.g., the set of EVs, including EVs 104 through 110) match, or at least substantially match, the regulation signal associated with the electric grid 112 using discrete switching of EVs as opposed to conventional incremental adjustment.

For each scheduling period, the dispatch controller 120 can assign each EV of the set of EVs a target percentage of the total aggregator energy dispatched during that scheduling period. This can be based at least in part on the EVs schedule using, for example, a V2G optimization algorithm(s). As more fully disclosed herein, the dispatch controller 120 can assign each EV in the set of EVs a respective priority level for charging of the EVs relative to the other EVs in the set of EVs, wherein switching of charging states of the EVs can be based at least in part on the respective priority levels of the EVs. To facilitate controlling switching of the EVs (e.g., 104 through 110), the dispatch controller 120 can utilize the disclosed dispatch method, in accordance with defined power regulation criterion.

The dispatch controller 120 can regulate power generation of the electric grid 112 at least in part by controlling switching (e.g., binary switching) of each individual EV (e.g., 104 through 110) around the aggregator's POP (e.g., the POP for the aggregator component 102). To achieve this, the dispatch controller 120 can add the POP to the regulation signal received by the system operator. The dispatch controller 120 can determine the number of EVs of the set of EVs (e.g., 104 through 110) that are to be used (e.g., switched on to charging state in relation to the electric grid 112) to meet that energy level associated with the POP based at least in part on the respective power draws of the EVs (e.g., 104 through 110) when switched to the on state. The dispatch controller 120 can employ defined logic, in accordance with defined regulation criterion, to facilitate determining which EVs (e.g., 104 through 110) are to be switched to the on state to be charged by the electric grid 112 (e.g., via the respective charging stations 114, 116, and/or 118) based at least in part on the respective energy needs of those respective EVs for a specified time period (e.g., a specified time period of less than an hour, a one-hour time period, a specified time period of greater than one hour).

The dispatch controller 120 can communicate dispatch signals to those EVs (e.g., only those EVs) of the set of EVs that are changing state (e.g., changing from an off state to an on state to be charged by the electric grid 112; changing from an on state to an off state to discontinue being charged by the electric grid 112). In some embodiments, the dispatch controller 120 can transmit dispatch signals to those EVs in a subset of the set of EVs that are to change their charging state to those EVs in the subset of EVs or to charging stations in a subset of charging stations (e.g., charging station(s) 114, 116, and/or 118) respectively associated with those EVs in the subset of EVs. In response to receiving the dispatch signals (e.g., switching signals), the respective EVs in the subset of EVs, via those EVs themselves and/or respective associated charging stations, can change their charging state from a current charging state to a different charging state, in accordance with the dispatch signals.

Figure 2:
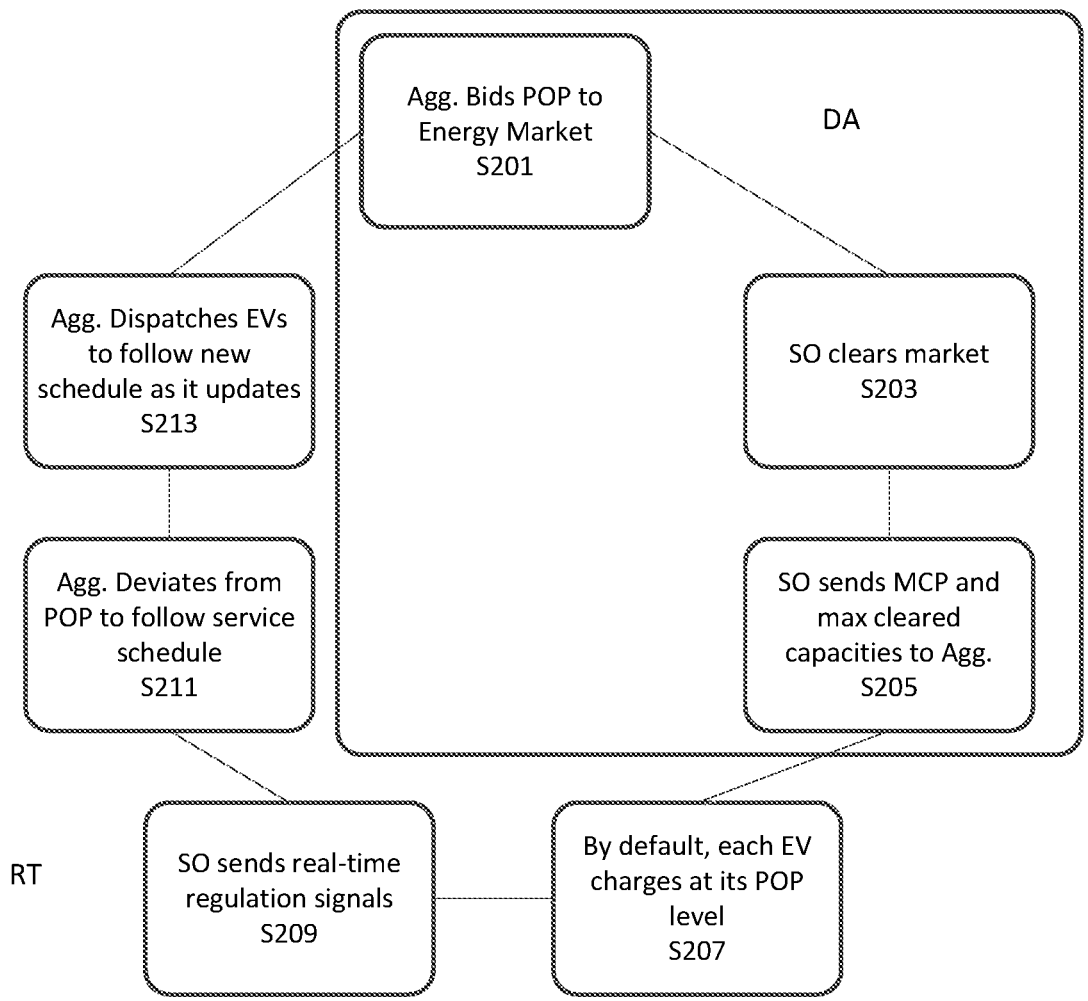
FIG. 2 is a flowchart of steps performed by an aggregator to participate in regulation markets according to an exemplary aspect of the disclosure.

FIG. 2 is a flowchart of steps an aggregator typically takes to participate in regulation markets. Electric vehicles can provide regulation to the electricity markets by modulating their charge rates above or below their pre-set charge schedules, or POP. Aggregators combine the regulation capacities of many EVs in order to facilitate the provision of this service to the markets. A way that aggregators may make profits is by providing ancillary services to the electricity markets.

The general procedure carried out in electricity markets, as seen in FIG. 2, is that the aggregator determines the amount of purchased energy to schedule at each hour, or the preferred operating points (POP), from the energy market. Also, the aggregator determines the hourly regulation capacities to schedule at the regulation markets. As a market participant, the aggregator attempts to set up these schedules such that its profits are maximized. Subsequently, in S201, all market participants submit their bids for that specific period to the system/market operator (SO) ahead of time, e.g. 24 hours ahead. In S203, the SO runs a market clearing mechanism for a specified time (e.g. an hour of the day) and determines the winning participants. In S205, the SO sends the market clearing prices and cleared capacities to the aggregator (and other winning participants). In real time, the SO will send to the aggregator regulation signals. In S207, if the regulation signal is zero, the aggregator will charge each EV at its pre-determined POP. In S209, if the regulation signal is nonzero, in S211, the aggregator will deviate from its overall POP to match the regulation service signal sent by the SO. In S213, the aggregator will dispatch EVs to follow a new schedule as it updates. The loop in FIG. 2 repeats for each different market period of the day.

It is up to the aggregator to decide on how to execute the regulation command (i.e. which EVs to dispatch) when the ancillary regulation service is to be provided in real-time. A simple and intuitive option would be to regulate the charging rate of all the charging EVs proportionally with the command signal, i.e. incremental dispatch on all EVs. As noted earlier, this option is inefficient since it requires the aggregator to send dispatch signals to each single EV being charged. Moreover, this signal would need updating at a very high dispatch rate; e.g. once every four seconds. This process clearly requires a large communication bandwidth and the EV charger needs to be capable of regulating its charging rate continuously. Discrete dispatch is one way to significantly reduce the required bandwidth because it involves sending fewer signals, each of which also is represented by a reduced signal byte size. Embodiments relate to an optimal RT dispatch formulation that is based on discrete unidirectional dispatch.

Figure 3:
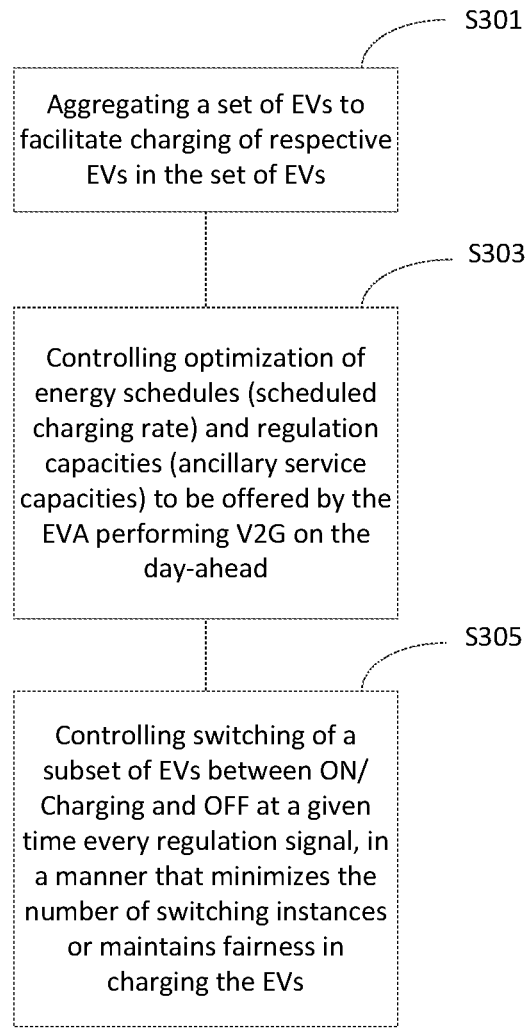
FIG. 3 is a flowchart for a two-stage charging management framework according to an exemplary aspect of the disclosure.

FIG. 3 is a flowchart for a two-stage charging management framework according to an exemplary aspect of the disclosure. An embodiment involves a two-stage charging management framework for an EVA that participates in energy and frequency regulation markets. In S301, the embodiment assumes that an aggregator has aggregated a set of EVs to facilitate charging of respective EVs in a set of EVs. A first stage relates to a DA charge management strategy. A second stage relates to a RT charge management strategy. In the first stage S303, the energy schedules and regulation capacities to be offered by the EVA performing V2G are optimized on the day-ahead (DA). An objective is to maximize the EVA profits while satisfying the distribution system and EV constraints. In this stage, EVA schedules are prepared that take into account the EV arrival and departure times, required final state of charge, EV battery and charger characteristics, and the EV mobility data. The first stage also assumes that the EVA aggregates EVs that are located at multiple distribution systems, each of which has its own network constraints that must be observed by the EVA. The approach used in the first stage is a modified version of methods described in E. Sortomme et al., 2011, and M. Ansari et al.

In S305, the second stage involves a real-time (RT) dispatch strategy to be used by the EVA. One objective of the RT dispatch strategy is to ensure meeting the frequency regulation command signal while reducing communication traffic (see E. Sortomme, U.S. Pat. No. 9,054,532, herein incorporated by reference in its entirety). The RT dispatch strategy reduces both the number of communication messages and the amount of information sent with each message. To reduce the amount of information sent with each message, binary charging commands are sent by the EVA to the EVs instead of communication messages that contain real-valued commands. Replacing the communication messages having real-valued charging rate commands by binary-valued charging commands significantly reduces the number of bits that are sent by the EVA through the communication channel. Use of a binary value to represent charging on or off has been suggested by several prior works in the literature (see E. Sortomme and K. W. Cheung, March 2012; S. Han et al.). Also, this type of control is most appropriate for charging stations currently available in the market.

Another objective of the RT dispatch strategy is to maintain charging fairness among EVs. The RT dispatch strategy allows the EVA to dispatch more or less than incremental dispatch. Dispatching more than the incremental dispatch allows EVs to reach their target SOC faster. As used herein, target SOC, required final SOC and scheduled target final SOC are used interchangeably. It is preferred that an actual final SOC be greater than or equal to the target SOC. However, dispatching much higher charging rates can have adverse effects on other EVs. Subsequently, the objective function of the RT dispatch strategy stage is formulated so as to minimize the change in charging status of individual EVs while maintaining charging fairness among them. This is effective under the reasonable assumption that the EVA communicates with the EV only if a change in charging rate is required. RT optimization is used so that the discrete unidirectional dispatch problem can be solved rapidly to match system regulation signal update rates (typically every 2-6 seconds). The strategy is evaluated based on the ability to meet the frequency regulation command signal, the amount of communication traffic required, and EV owners' satisfaction, as well as fairness among the EVs as they participate in providing frequency regulation.

Day-Ahead Scheduling

Figure 4:
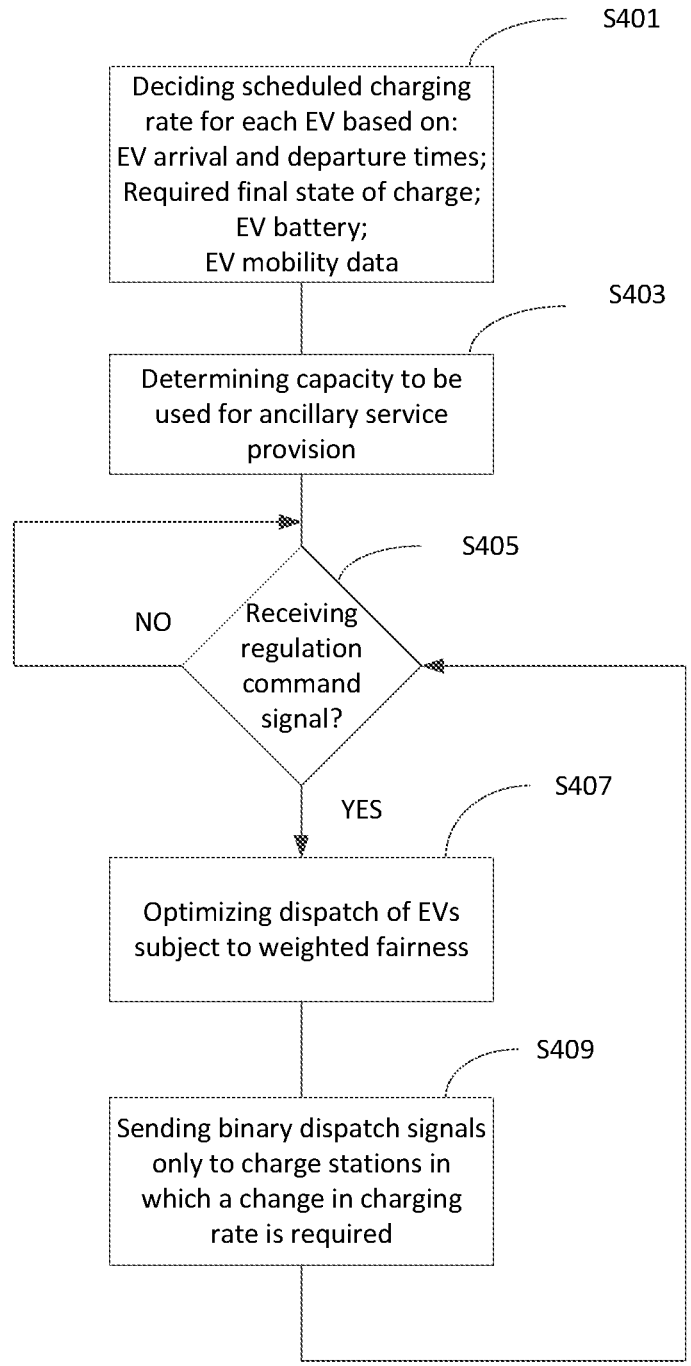
FIG. 4 is a flowchart of a two-stage charging management process in accordance with an exemplary aspect of the disclosure.

FIG. 4 is a flowchart of a two-stage charging management process in accordance with an exemplary aspect of the disclosure. The day-ahead (DA) scheduling method is based on that introduced in E. Sortomme and M. A. El-Sharkawi, March 2012 incorporated herein by reference in its entirety. Based on this method, in S401, the scheduled charging rate/Preferred Operating Point (POP) for each EV is decided. Also, in S403, the capacity to be used for ancillary service provision is determined. These are submitted as bids to the independent system operator (ISO). Once these bids are accepted, the scheduled charging rate and ancillary service capacities are used as inputs for the real-time dispatch method.

Real-Time Dispatch

The RT dispatch method optimizes discrete dispatch of EVs participating in unidirectional V2G. In discrete dispatch, the EVs will have either one of two states, ON/Charging or OFF. This optimal dispatch method can be formulated as an integer linear program. The decision variable is, then, a binary number with value of 1 if the EV is charging and 0 when it is switched off. The objective of this optimal dispatch method is to minimize the total number of switching instances needed each time a new regulation signal is received such that the regulation command signal is met. This, subsequently, reduces the number of message signals sent by the aggregator and reduces the number of bits sent with each message. The optimal dispatch method determines the optimal solution in real-time in order to satisfy the frequency regulation command signal. In S405, upon receiving the regulation command signal, in S407, the dispatch of EVs is optimized subject to weighted fairness values. The objective function and constraints are expressed as follows:

Minimize $$\sum_{i=1}^{N}(SwOn_{i,t} + SwOff_{i,t}) + \sum_{i=1}^{N} F_{i,t} \cdot AccFDE_{i,t} \quad (1)$$

Subject to $$SwOn_{i,t} = \max(0, EV_{i,t-1} - EV_{i,t}), \forall i \in N \quad (2)$$

$$SwOff_{i,t} = \max(0, EV_{i,t} - EV_{i,t-1}), \forall i \in N \quad (3)$$

$$SOC_i^{min} \leq SOC_{i,t} \leq SOC_i^{max}, \forall i \in N \quad (4)$$

$$SOC_{i,t} = SOC_{i,t-1} + EV_{i,t} \cdot MP_{i,t} \cdot dt - CE_{i,t}, \forall i \in Av_t \quad (5)$$

$$\sum_{i=1}^{N} EV_{i,t} \cdot MP_i = DisSig_t(POP_{i,t}, RegSig_t), \forall i \in Av_t \quad (6)$$

The method is in the form of an integer problem due to the binary nature of the decision variable EV. The objective function (1) minimizes the total number of switching instances each time a new regulation signal is received. ON-to-OFF transitions are defined by (2); OFF-to-ON transitions are defined by (3). In order to ensure fairness, a weighted fairness metric is included in the objective function. F is a vector whose length is equal to the number of EVs in the aggregator's fleet. Each element of F is a weight associated with a single EV. The values of F can be selected based on the aggregator's preference on prioritizing either minimizing switching or increasing fairness in dispatch. This will be explained in further detail later.

Relation (4) ensures that the state of charge of each EV is maintained within acceptable limits. This helps EV owners expect to have the EVs charged at an acceptable level even if unexpected departures take place. The state of charge of the EVs is updated in (5). Initially, i.e. at the beginning of the analysis period, $SOC_{i,t-1}$ represents the initial (or arrival) state of charge of vehicle i.

Constraint (6) is to ensure that all available EVs at each time instance are dispatched to follow the regulation command. It is important to note that $DisSig_t$ is a discretized version of the actual regulation signal $Sig_t$, where $Sig_t$ is the summation of the aggregated POP of the fleet and the received regulation signal from the system operator, $RegSig_t$, as in (7). Since the decision variables are binary, discretizing the signal (8) is an important step to facilitate the optimization since the overall dispatching power capacity can take on discrete values only, which are multiples of $MP_i$. This is a valid assumption since the introduced error from discretization is reduced to acceptable levels when dispatching large numbers of EVs, as verified in E. Sortomme and K. W. Cheung, March 2012. It should be noted that the values of $MP_i$ are the same for all EVs.

$$Sig_t(POP_{i,t}, RegSig_t) = \sum_{i=1}^{N} POP_{i,t} + RegSig_t, \forall i \in N \quad (7)$$

$$DisSig_t = \text{floor}\left(\frac{Sig_t}{MP}\right) \cdot MP \quad (8)$$

The method maintains fairness in charging the EVs. To ensure fairness, an incremental dispatch signal is used as a reference. For each EV, the difference between the discrete dispatch signal and the reference incremental dispatch signal must be maintained within an acceptable range. This will guarantee that no EV experiences significant deviation from the ideal case of incremental dispatch. Thus, this ensures satisfaction of EV owners. The instantaneous fairness dispatch error (FDE) is defined as in (9).

The original incremental dispatch signal (IncDisO) for each EV is evaluated, as in (10), by using the pre-scheduled POPs and bid capacities of each EV along with the actual received regulation signal from the system operator. In (10), the received regulation signal can be for performing either a regulation up or a regulation down service, so the corresponding bid regulation capacity should be used. According to (9), the instantaneous FDE is the percentage difference between actual dispatch and incremental dispatch. Any change in power less than 1W is considered negligible, and then the FDE will be the absolute difference between the two signals. This is used to avoid excessively high values (or even infeasible values) of FDE if the incremental dispatch signal is very small (or zero).

$$FDE_{i,t} = \frac{|EV_{i,t} \cdot MP_{i,t} - IncDisO_{i,t}|}{\max(IncDisO_{i,t}, 1)} \quad (9)$$

$$IncDisO_{i,t} = POP_{i,t} + \frac{|RegSig_t \cdot RegCap_{i,t}|}{\sum_{i=1}^{N} RegCap_{i,t}} \quad (10)$$

The accumulated fairness dispatch error (AccFDE) for each EV is simply the integration of the instantaneous fairness dispatch error (FDE) over time and can be computed using (11).

$$AccFDE_{i,t} = \sum_{\tau=1}^{t} FDE_{i,\tau}, \forall i \in Av_t \quad (11)$$

Incremental dispatch can be considered the fairest way to dispatch the EVs. However, it's the least efficient as it requires sending a communication message to each available EV to update its dispatch. Aggregators can control F to maintain a desirable balance between fairness and flexibility in dispatch which can potentially further reduce the switching signals. The values of the elements of the F vector are initially the same for all EVs. By applying simple heuristics, the value of F corresponding to an EV can be modified dynamically to change the dispatch priority such that more EVs can catch up with their scheduled incremental dispatch signals and meet their target SOCs. This is done simply by dividing the initial F associated with EVs that exceeded their targeted SOCs by a factor that would adequately decrease its value. That factor is a sufficiently large constant with a value that would result in a significant contrast between the different $AccFDE_{i,t}$ of the EVs. Consequently, a higher perceived error than normal would be associated with those particular EVs making the optimizer prioritize charging other EVs, with normal accumulated FDE values, that have not reached their targets.

In other words, $F_i$ can be expressed as:

$$F_{i,t} = \begin{cases} F_{i,0} & SOC_{i,t} < SOC_{i,t,targeted} \\ F_{i,0}/\alpha & SOC_{i,t} > SOC_{i,t,targeted} \end{cases}$$

where $\alpha > 1$, and $$SOC_{i,t,targeted} = \sum_{\tau=1}^{t} IncDisO_{i,\tau}$$

In S409, the EVA sends the binary dispatch signals to the EV only if a change in charging rate is required.

Performance Metrics

Some metrics have been developed in order to analyze and evaluate the performance of the two stages. These metrics help in evaluating the performance of the disclosed method and compare it with a benchmark heuristic dispatch. The first performance metric is the total number of messages sent. As mentioned earlier, one of the main objectives of the method is to minimize the communication traffic costs through reducing the overall number of switching instances.

The second metric is the number of EV violations, which is defined as the number of EVs with final SOCs lower than 90% of the scheduled target final SOC if incremental dispatch were employed. This metric is important since it is an indicator of charging fairness and EV owner satisfaction.

The third metric is also related to fairness. It is the energy difference error (EDE), in Wh, per time instance between the actual optimal dispatch and incremental dispatch; that is (actual-incremental)*dt. This is different from FDE in the sense that it is in terms of energy instead of power and that it can take on negative values. It gives an indication of whether the method is dispatching more or less than the benchmark schedule. In the case of unidirectional dispatch, having positive EDE would indicate charging more than incremental dispatch, which can be considered better since it would allow EVs to reach their target SOCs faster. However, being much higher than the scheduled operating point of an EV can have adverse effects on other EVs in the fleet as will be elaborated later. Also, fully charging many EVs prematurely reduces the EVA ability to follow the regulation signal.

Calculating EDE

The EDE is the error taken with respect to incremental dispatch. However, the considered incremental dispatch signal can have two modes, the original and the adjusted values. The value and behavior of the computed EDEs can be very different depending on which type is selected.

The first method in calculating the EDE is to use the original incremental dispatch signal as the reference. This means that the value of the incremental dispatch signal of an EV depends on both its schedule and the received regulation signal and is computed per EV using (9) but without the absolute values. i.e.

$$EDE_{i,t} = \frac{EV_{i,t} \cdot MP_{i,t} - IncDisO_{i,t}}{\max(IncDisO_{i,t}, 1)}$$

If this signal is used as a reference for calculating the EDE per EV, the accumulated EDE per EV profile will show some symmetry in the sense that if some EVs get more energy than scheduled, then this extra energy will have to come at the expense of other EVs causing them to receive less energy than scheduled. Moreover, if any dispatch model is used, the average accumulated EDE at each time instant will be identical since the same amount of total energy is received by the fleet.

An illustrative example is used to demonstrate this concept. For simplicity, it is assumed that one regulation signal is received at each hour. Assume the initial SOC of 3 EVs is at 60% of their 1 kWh capacities. Also, assume that the received regulation signal is 0.3 kW for each of the four hours under consideration. If incremental dispatch is used, each of the three EVs would contribute 0.1 kW to meet the regulation command signal. To meet the same regulation signal using optimal dispatch, the contributions of each EV are shown in Table I. Note that the summation of each dispatch column is equal to 0.3 kW, which is the hypothetical hourly regulation signal. Also, after hour 2, EV1 cannot be dispatched since it has reached its maximum SOC (0.6+0.2+0.2=1 kWh). Similarly, EVs 2 and 3 became fully charged by the end of hour 4. Table II shows the EDE with respect to the original incremental dispatch signal. It can be observed that the hourly EDE summation; i.e. column-wise, is zero. Moreover, the accumulated EDE per EV also adds up to zero.

The adjusted incremental dispatch signal can be different from the original one depending on the SOC of an EV. If an EV becomes fully charged/above a certain threshold, it can be considered effectively unavailable even though it is still connected to the aggregator's system. It can be argued that the calculated EDE should be neglected if an EV becomes effectively unavailable. Doing otherwise would give a false indication that the EDE is negative at a time where there is nothing that can be done about it. Then, calculating the adjusted incremental dispatch signal (IncDisA) per EV can be done simply by using (12). $effAv_{i,t}$ is the effective availability of the i-th EV at time instant t; it is updated according to (13). This means that when an EV reaches its maximum allowed SOC, it is considered effectively unavailable by the aggregator.

$$IncDisA_{i,t} = IncDisO_{i,t} \times effAv_{i,t} \quad (12)$$

$$effAv_{i,t} = \begin{cases} 0, & SOC_{i,t} = SOC_i^{max} \\ Av_{i,t}, & \text{otherwise} \end{cases} \quad (13)$$

The EDE computed using the adjusted incremental dispatch signal as reference, i.e. the results of the second method, are shown in Table III. It can be observed now that the summation of each column does not always add to zero since the EDE accumulation stops once an EV becomes effectively unavailable. Thus, when calculating the total accumulated EDE per EV, the final values do not necessarily add up to zero. For EV1 for instance, the negative EDE values do not enter the accumulated EDE calculations anymore, making the total accumulated EDE for EVs 1, 2, and 3, respectively 0.2, 0, and 0 kWh. It is important to note here that the actual dispatches of the EVs do not change and each EV receives the same energy as in the first method. The only difference is in the way of calculating EDE.

The first method is simpler in understanding in the sense that the total amount of energy shifting between EVs in the system can be easily observed. There is no correlation between the EDEs of the EVs if computed using the second method. However, it can be argued that the second method is more effective since it does not give a false sense of energy errors that will be accumulated through time when an EV becomes effectively unavailable for dispatch.

Case Studies and Results

The EV charge management framework is tested on a system and its performance is evaluated against a heuristic dispatch algorithm developed in E. Sortomme and K. W. Cheung, March 2012, which will be considered as a benchmark model.

The proposed algorithm is tested on a system of 1000 EVs comprised of Tesla Model S85D (see Tesla, "Model S" 2015, [Online]. Available: https://www.teslamotors.com/models/ [Accessed: Mar. 1, 2015]), Ford Focus Electric (see Ford, "Focus Electric, Power and Handling" 2016, [Online]. Available: http://www.ford.com/cars/focus/trim/electric [Accessed: Apr. 4, 2016]), Tesla Model 60D, Tesla, and Nissan Leaf (see Nissan, "2016 Leaf" 2016, [Online]. Available: http://www.nissanusa.com/electric-cars/leaf/ [Accessed: Apr. 4, 2016]), whose characteristics are given in Table IV. The simulation is performed for a whole day using PJM regulation signals. (See PJM, "Ancillary Service Market Results" 2015, [Online]. Available: http://www.pjm.com/markets-and-operations/ancillary-services.aspx [Accessed: Dec. 18, 2015].) The signal has a four-second resolution. It is assumed that all vehicles are fully charged initially. The schedules for the POP and the regulation capacities are generated using the algorithm in E. Sortomme and M. A. El-Sharkawi, March 2012, on ERCOT market data. The discrepancy between the schedules and dispatch data is due to unavailability of ERCOT's regulation signal. However, as regulation signals are mostly random, it is not unreasonable to assume that a similar signal could occur on a given day in ERCOT.

Figure 5:
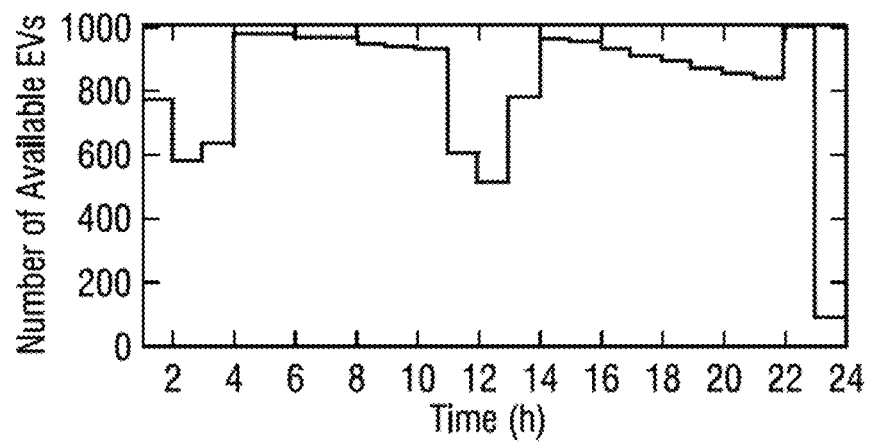
FIG. 5 is a graph showing hourly expected EV availability for dispatch.

Using historical data, an aggregator can determine the expected numbers of EVs available for dispatch. FIG. 5 shows the expected number of EVs available for dispatch by the aggregator. EVs consume energy during commute trips through the day, making them unavailable to dispatch during these times. It is assumed that EVs go for two trips daily. The first trip occurs sometime during the first hours of simulation and the second is around the middle of the day. Therefore, it is observed that the expected number of available EVs is low during these times. These numbers, however, are prone to change in case some EVs became charged after reaching $SOC^{max}$ or due to unexpected leaving/disconnecting events.

TABLE I

ACTUAL OPTIMAL DISPATCH OF SAMPLE CASE

| Dispatch (kW) | Hr.1 | Hr.2 | Hr.3 | Hr.4 |
|---|---|---|---|---|
| EV1 | 0.2 | 0.2 | 0 | 0 |
| EV2 | 0.1 | 0.1 | 0.1 | 0.1 |
| EV3 | 0 | 0 | 0.2 | 0.2 |

TABLE II

EDE EVALUATED WITH RESPECT TO ORIGINAL INCREMENTAL DISPATCH SIGNAL

| EDE (kWh) | Hr.1 | Hr.2 | Hr.3 | Hr.4 |
|---|---|---|---|---|
| EV1 | 0.1 | 0.1 | −0.1 | −0.1 |
| EV2 | 0 | 0 | 0 | 0 |
| EV3 | −0.1 | −0.1 | 0.1 | 0.1 |

TABLE III

EDE EVALUATED WITH RESPECT TO ADJUSTED INCREMENTAL DISPATCH SIGNAL

| EDE (kWh) | Hr.1 | Hr.2 | Hr.3 | Hr.4 |
|---|---|---|---|---|
| EV1 | 0.1 | 0.1 | 0 | 0 |
| EV2 | 0 | 0 | 0 | 0 |
| EV3 | −0.1 | −0.1 | 0.1 | 0.1 |

TABLE IV

EV PARAMETERS

| EV Model | Battery Capacity (kWh) | Charger Rating (kW) | Number of EVs in System |
|---|---|---|---|
| Model S 85D | 85 | 3.3 | 250 |
| Focus | 23 | 3.3 | 250 |
| Model S 60D | 60 | 3.3 | 200 |
| Leaf | 24 | 3.3 | 300 |

The simulations are performed on a Windows 10 Pro PC with an Intel Core i7-3630QM processor (CPU @ 2.40 GHz), installed RAM of 32.0 GB (approximately 2-3 GB required). The software used is CVX, which is a Matlab-based optimization toolbox. The optimizer chosen is Gurobi 6.0.5. The time taken to solve an optimization problem each time instant is less than 0.25 seconds, leaving the remainder of the four seconds to perform any other necessary actions before receiving another regulation signal.

The benchmark heuristic dispatch algorithm E. Sortomme and K. W. Cheung, March 2012, is tested on a signal developed using the scheduling algorithm of E. Sortomme and M. A. El-Sharkawi, March 2012. Then, the proposed optimal model is employed to perform the dispatch instead of the incremental dispatch method used in E. Sortomme and M. A. El-Sharkawi, March 2012. The initial value for $F_i$ is $F_{i,0}=1/15000^2$. This value of F is chosen by observing the system characteristics. In this case, the EV fleet consists of 1000 vehicles, each with charger ratings in magnitudes of kWs. The aggregator would then initialize F to have values in magnitudes of the reciprocal of (N×charger rating magnitude; i.e. 1000×1000), to make the first and second terms of the objective function given by (1) comparable in magnitude. Then, that number is further divided by an adequately large number (here 15) to accommodate the effects of FDE accumulation and to prioritize switching. When an EV reaches its targeted SOC, its corresponding $F_i$ should be decreased even further.

That is, in the case study $F_{40}=1/15000^2$, for the reasons described above. A weighting factor of $1/1000^2$ would make the fairness term (second term in relation (1)) comparable in magnitude to the switching term (first term in relation (1)). To slightly prioritize minimizing switching, the case study sets $F_{i,0}=1/15000^2$. This value of $F_{1,0}$ is used for all EVs before their target SOC is reached. Any EV that reaches its target SOC is de-prioritized by assigning it an even smaller value of $F_{i,t}$. In this case, $F_{i,t}=F_{i,0}/50$.

The simulation results of the base case are summarized in Table V. The optimal model clearly shows significant reduction in the total number of messages sent. This reduction is around 10% when compared to the benchmark heuristic dispatch method in E. Sortomme and K. W. Cheung, March 2012. Moreover, the total accumulated EDE of all EVs is obtained using the second method, explained in Section V, and the overall averaged values at the end of the charging period are shown in Table V. The optimal model has lower mean accumulated EDE indicating that it is better in terms of fairness in charging the EVs with respect to the incremental dispatch signal. It is important to point out that the optimal algorithm used actual incremental dispatch signals as reference for fairness whereas the benchmark heuristic dispatch algorithm depended on the expected values of energy to be received making the developed model more reliable in dispatching the EVs in a fair manner. The EV violations in both models are found to be equivalent. This means that all EVs achieved a final SOC that is exceeding 95% of their corresponding target SOC.

Figure 6:
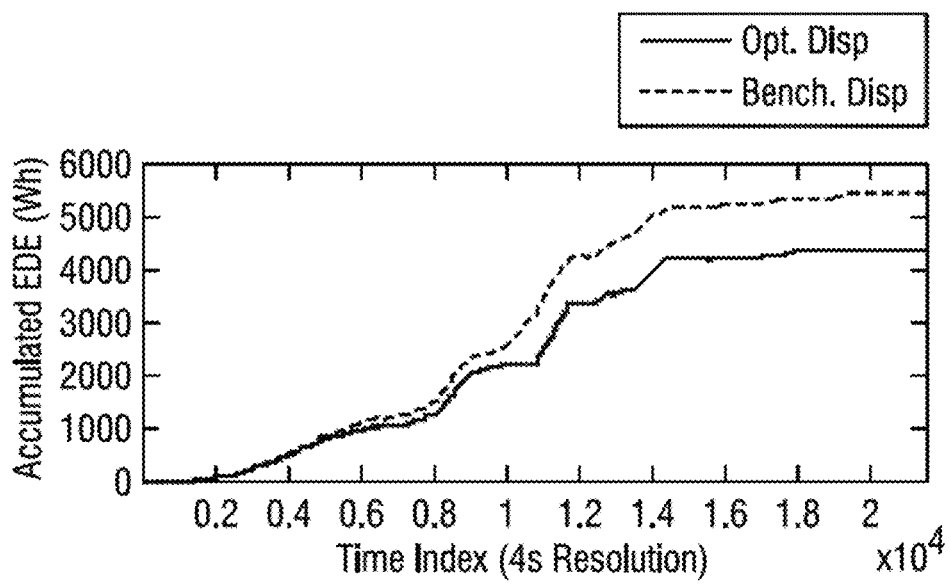
FIG. 6 is a graph of average accumulated EDE comparison of the optimal and benchmark models.

The final value of the average accumulated EDE might not be enough to guarantee fairness. It is also important to analyze the average accumulated EDE throughout the analysis period, which is illustrated in FIG. 6. It can be seen that the accumulated errors through time are lower using the proposed optimal model, indicating better performance in following the actual incremental dispatch. This also indicates that the EVs are becoming fully charged faster by following the schedule better and consequently having lower accumulated EDE profiles. The final values of each curve at the end of the simulation period are shown in Table V.

Figure 7:
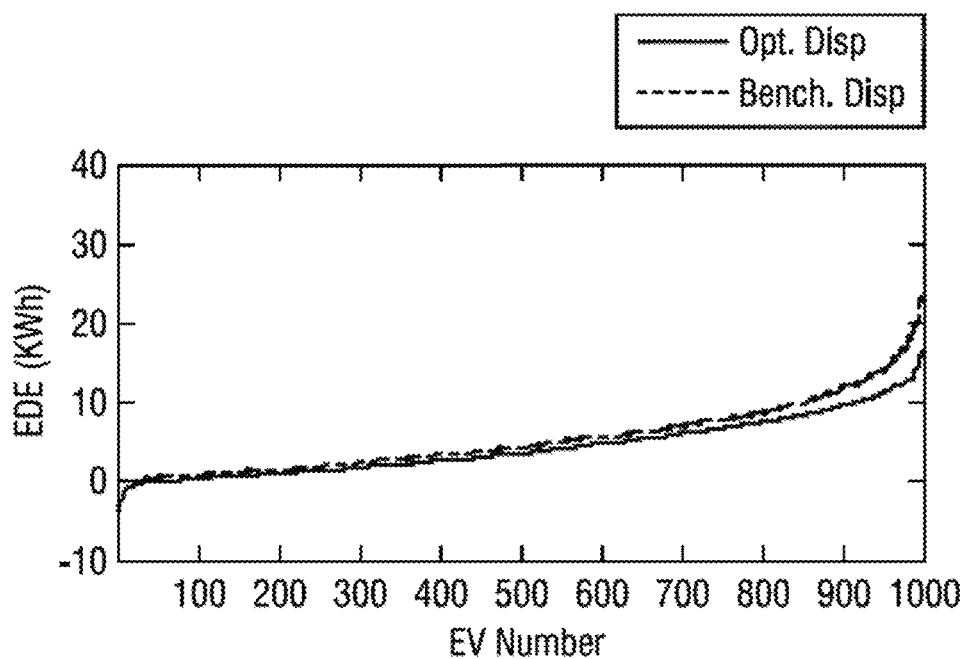
FIG. 7 is a graph of total accumulated EDE per EV comparison of the optimal and conventional models.

To get an even more detailed analysis, the total accumulated EDE per EV is given in FIG. 7. The profiles are sorted in ascending order for better representation. It can be seen that the optimal model has an overall profile that is flatter around the zero axis than the benchmark heuristic dispatch model. This implies that the energy distribution over the EVs is closer to incremental dispatch using the optimal model, and thus a fairer method.

TABLE V

DISPATCH RESULTS OF BASE CASE

| Model | # of Messages | Total Mean Accumulated EDE | EV Violations |
|---|---|---|---|
| Optimal | 48175 | 4364.2 | 0 |
| Benchmark | 54579 | 5444.1 | 0 |

Sensitivity Analysis to Regulation Signal

Because regulation signals are random, the energy received from performing regulation will not always be the same each day. Sometimes the regulation needs will require more energy than expected and sometimes less. Therefore, sensitivity analyses are performed to compare the performance of the two algorithms with more and less energy than expected.

For the first sensitivity study, the regulation signal's magnitude is reduced by 50%. The simulations are conducted on both models similar to the base case but with half of the regulation signal. The results are summarized in table VI. The initial value for F is $1/15000^2$ as before. It is expected that the number of EV violations would increase since the overall energy that the EVs would receive would be reduced. Though the number of EV violations is higher than in the base case, the optimal algorithm results in significantly lower violations compared to the benchmark. The reduction in EV violations is around 76%. The mean accumulated EDE is also lower using the optimal model. Additionally, the optimal algorithm sends fewer messages than benchmark heuristic dispatch algorithm.

Figure 8:
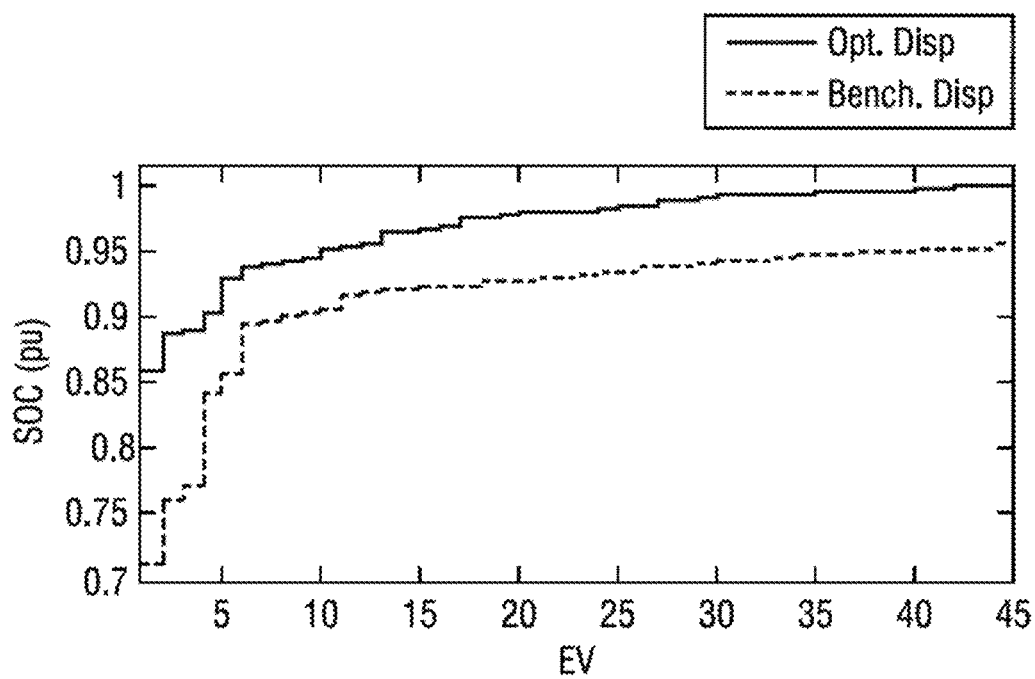
FIG. 8 is a graph of normalized final SOC profile with target of each EV as base using low scaled signal.

FIG. 8 shows the final SOC profile of the EVs sorted in ascending order. The values are normalized over their respective target SOCs. The first 51 EVs with lowest final SOC are shown. Note that EV violations are significantly lower. This means not only fewer EV owners will not meet their target using optimal model, they're also more likely to be satisfied than if the benchmark heuristic model is used.

Figure 9:
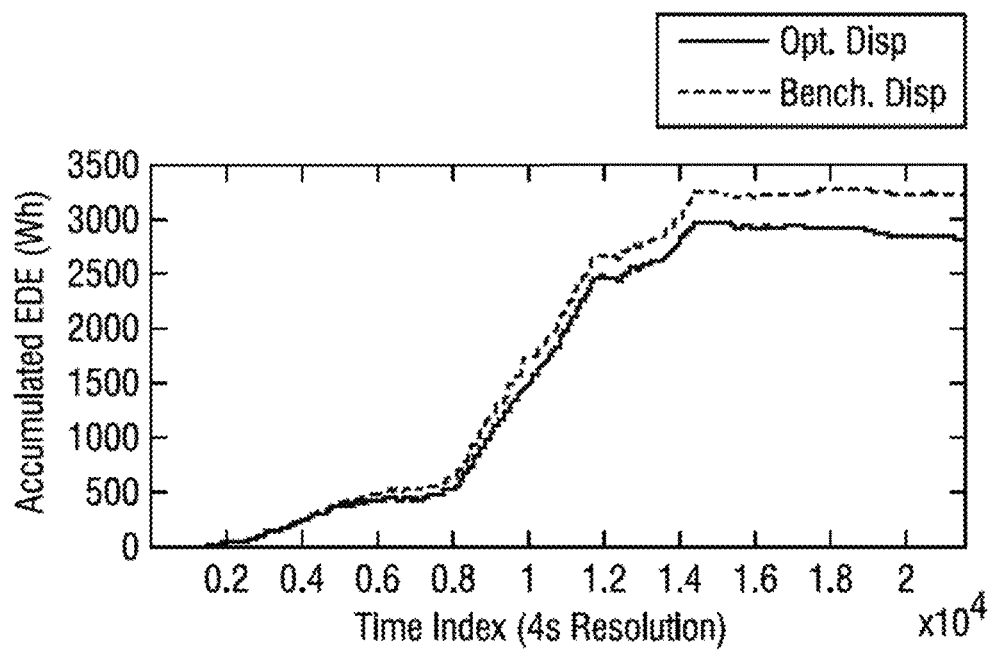
FIG. 9 is a graph of average accumulated EDE comparison of the optimal and benchmark models using low scaled signal.
Figure 10:
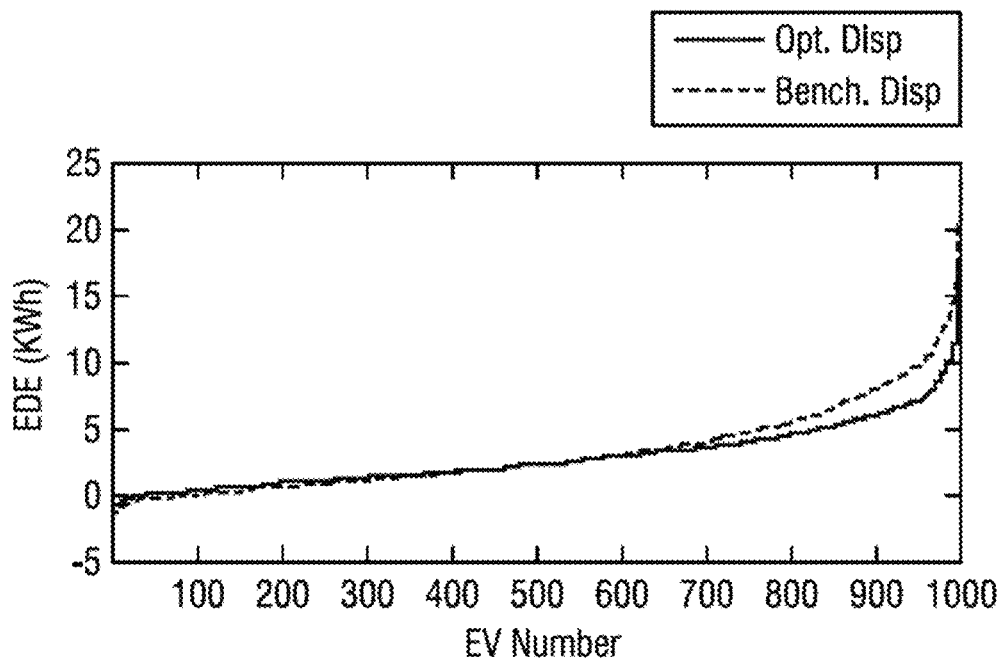
FIG. 10 is a graph of total accumulated EDE per EV comparison of the optimal and benchmark models using low scaled signal.

FIG. 9 shows how the average accumulated EDE profile through time is better using the optimal model and FIG. 10 illustrates how the accumulated EDE per EV profile is also flatter using the optimal model.

In the second sensitivity study, the signal is increased by 50%. Table VII summarizes the results for this case. The number of EV violations here is zero. Almost all EVs are fully charged since the overall energy received is increased. Though the number of EV violations is the same in this case, the optimal algorithm results in significant reductions in the total number of messages sent. The mean accumulated EDE is also lower using the optimal model.

Figure 11:
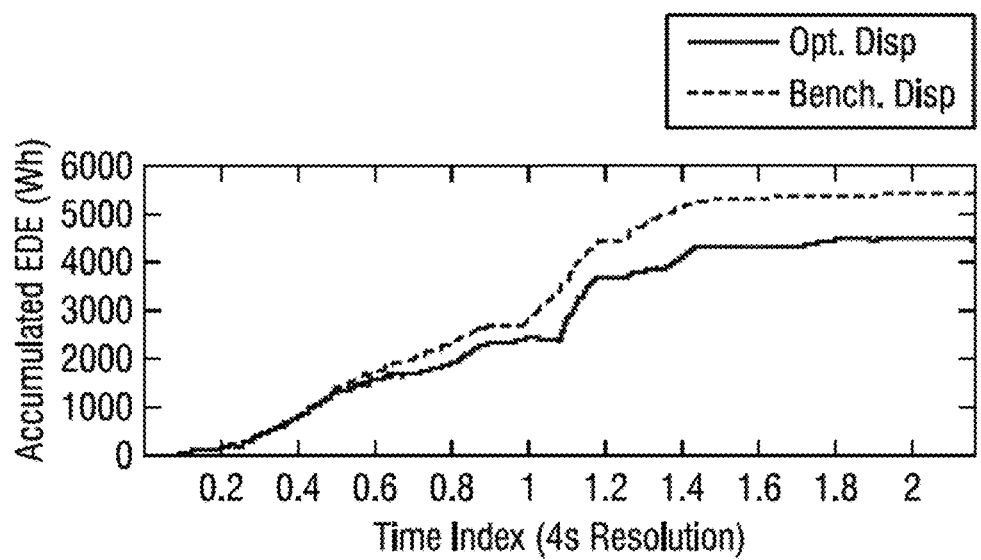
FIG. 11 is a graph of average accumulated EDE comparison of the optimal and benchmark models using high scaled signal.
Figure 12:
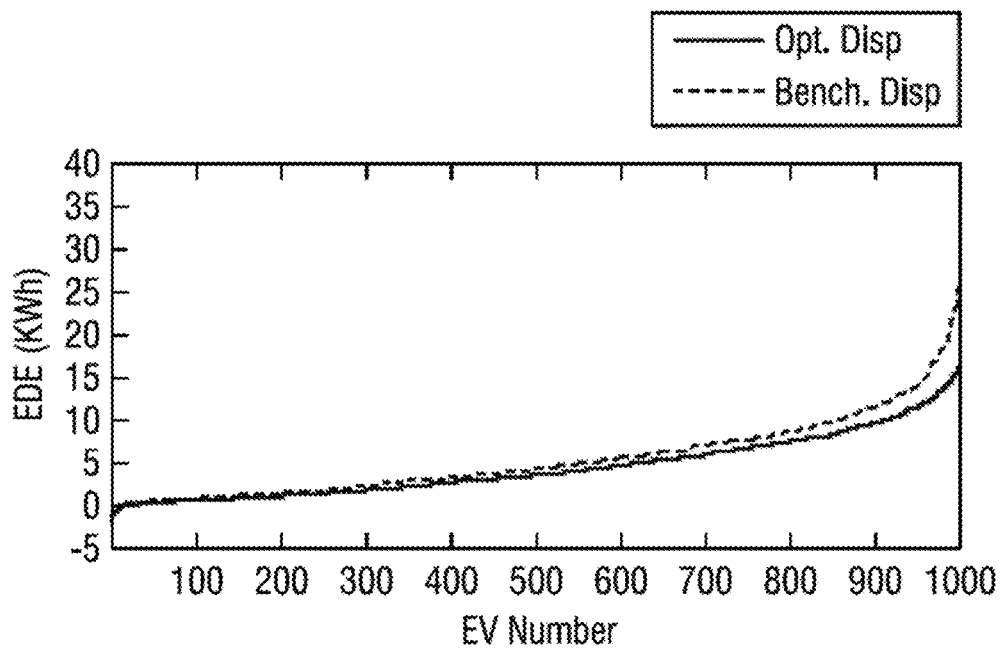
FIG. 12 is a graph of total accumulated EDE per EV comparison of the optimal and benchmark models using high scaled signal.

FIG. 11 shows how the average accumulated EDE profile is improved using the optimal model throughout the entire analysis period. FIG. 12 illustrates how the accumulated EDE per EV profile is flatter using the optimal model and noticeably lower than the benchmark one.

TABLE VI

DISPATCH RESULTS OF LOW SCALED CASE

| Model | # of Messages | Total Mean Accumulated EDE | EV Violations |
|---|---|---|---|
| Optimal | 33776 | 2807.9 | 10 |
| Benchmark | 34055 | 3197.4 | 41 |

TABLE VII

DISPATCH RESULTS OF HIGH SCALED CASE

| Model | # of Messages | Total Mean Accumulated EDE | EV Violations |
|---|---|---|---|
| Optimal | 51079 | 4429.5 | 0 |
| Benchmark | 66019 | 5403.9 | 0 |

Figure 13:
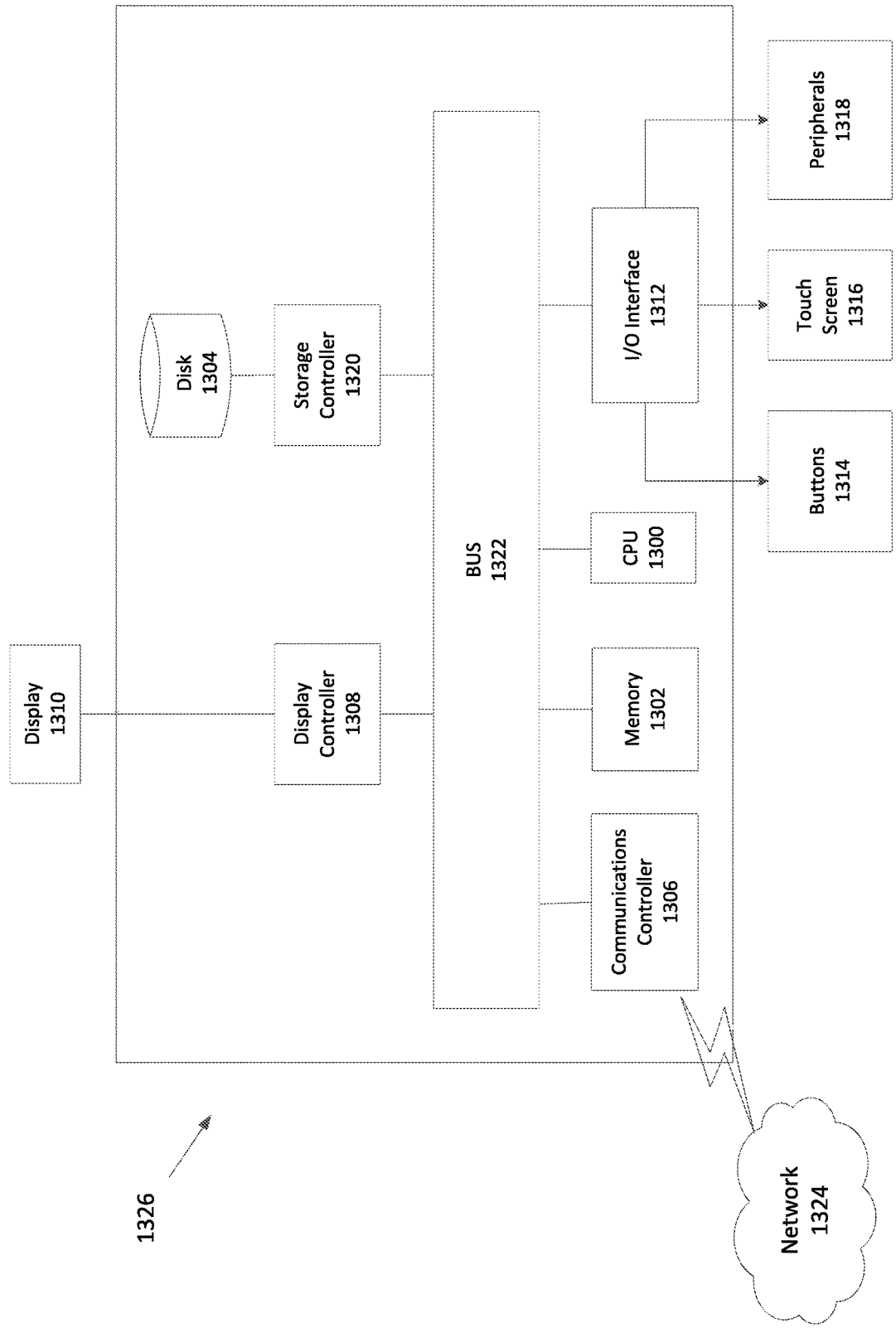
FIG. 13 is a block diagram for a computer implementation of a controller for an aggregator according to an exemplary aspect of the disclosure.

In one implementation, the functions and processes of the EV Aggregator 102, which includes the Dispatch Controller 120, may be implemented as a computer 1326. Although the Dispatch Controller 120 is depicted as being within the EV Aggregator 102, the disclosed subject matter is no so limited. In some embodiments, the AV aggregator 102 and the Dispatch Controller 120 may be separately configured. Next, a hardware description of the computer 1326 according to exemplary embodiments is described with reference to FIG. 13. In FIG. 13, the computer 1326 includes a CPU 1300 which performs the processes described herein. The process data and instructions may be stored in memory 1302. These processes and instructions may also be stored on a computer-readable storage medium 1304 such as a hard drive (HDD) or portable storage medium or may be stored remotely. Further, the claimed advancements are not limited by the form of the computer-readable medium on which the instructions of the inventive process are stored. For example, the instructions may be stored on CDs, DVDs, in FLASH memory, RAM, ROM, PROM, EPROM, EEPROM, hard disk or any other information processing device with which the computer 1326 communicates, such as a server or computer.

Further, the claimed advancements may be provided as a utility application, background daemon, or component of an operating system, or combination thereof, executing in conjunction with CPU 1300 and an operating system such as Microsoft® Windows®, UNIX®, Oracle® Solaris, LINUX®, Apple macOS® and other systems known to those skilled in the art.

In order to achieve the computer 1326, the hardware elements may be realized by various circuitry elements, known to those skilled in the art. For example, CPU 1300 may be a Xenon® or Core® processor from Intel Corporation of America or an Opteron® processor from AMD of America, or may be other processor types that would be recognized by one of ordinary skill in the art. Alternatively, the CPU 1300 may be implemented on an FPGA, ASIC, PLD or using discrete logic circuits, as one of ordinary skill in the art would recognize. Further, CPU 1300 may be implemented as multiple processors cooperatively working in parallel to perform the instructions of the inventive processes described above.

The computer 1326 in FIG. 13 also includes a communications controller 1306, such as an Intel Ethernet PRO network interface card from Intel Corporation of America, for interfacing with network 1324. The communications controller 1306 can transmit a dispatch signal to, for example, charging stations 114, 116, 118 and/or directly to EVs to facilitate controlling switching of EVs in accordance with the disclosed dispatch method. As can be appreciated, the network 1324 can be a public network, such as the Internet, or a private network such as LAN or WAN network, or any combination thereof and can also include PSTN or ISDN sub-networks. The network 1324 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 1326 further includes a display controller 1308, such as a NVIDIA® GeForce® GTX or Quadro® graphics adaptor from NVIDIA Corporation of America for interfacing with display 1310, such as a Hewlett Packard® HPL2445w LCD monitor. A general purpose I/O interface 1312 interfaces with a keyboard and/or mouse 1314 as well as an optional touch screen panel 1316 on or separate from display 1310. General purpose I/O interface also connects to a variety of peripherals 1318 including printers and scanners, such as an OfficeJet® or DeskJet® from Hewlett Packard®.

The general purpose storage controller 1320 connects the storage medium disk 1304 with communication bus 1322, which may be an ISA, EISA, VESA, PCI, or similar, for interconnecting all of the components of the computer 1326. A description of the general features and functionality of the display 1310, keyboard and/or mouse 1314, as well as the display controller 1308, storage controller 1320, network controller 1306, and general purpose I/O interface 1312 is omitted herein for brevity as these features are known.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A system, comprising:
    a processor, coupled to a memory, that executes executable program code, comprising:
    an aggregator that aggregates and manages charging of a set of batteries associated with an electric grid; and
    a dispatch controller that controls switching of at least a subset of batteries of the set of batteries between an ON state and an OFF state at a given time by sending binary charge commands to the subset of batteries, in a manner that change of charging rate of individual batteries is minimized while maintaining charging fairness among the respective batteries in the set of batteries,
    wherein the set of batteries is a set of rechargeable vehicle batteries contained in a respective set of electric vehicles (EVs),
    wherein the aggregator determines charging schedules a day ahead for each of the set of vehicle batteries of the EVs, wherein the charging fairness of each EV is a weighted fairness, and
    wherein the dispatch controller dynamically modifies the weighted fairness by dividing the weighted fairness associated with EVs of the set of EVs that exceed their scheduled charge by a constant factor in order to decrease the respective weighted fairness.

2. The system of claim 1, wherein the charging fairness is maintained by dynamically modifying a fairness value such that dispatch priority is increased among the set of EVs that have not reached their charging targets.

3. The system of claim 1, wherein the set of batteries are contained in plug-in electric vehicles that are plugged into charging stations, wherein the dispatch controller controls the switching by sending the binary charging commands to a subset of the charging stations.

4. The system of claim 1, wherein the aggregator manages charging of the set of EVs by sending the binary charging commands to the EVs in which it is determined that a change in charging rate is required.

5. The system of claim 4, wherein the determination that a change in charging rate is required is determined each time a regulation command signal is received.

6. The system of claim 5, wherein the regulation command signal is received in the range of every 2 to 6 seconds.

7. A method, comprising:
    a processor, coupled to a memory, that executes of executable program code, comprising:
    aggregating charging, by a system including at least one processor, a set of batteries associated with an electric grid; and
    controlling, by the system, switching of at least a subset of batteries of the set of batteries between an ON state and an OFF state at a given time by sending binary charge commands to the subset of batteries, in a manner that change of charging rate of individual batteries is minimized while maintaining charging fairness among the respective batteries in the set of batteries,
    wherein the aggregating charging of the set of batteries includes aggregating charging of a set of chargeable vehicle batteries contained in a respective set of electric vehicles (EVs),
    wherein the aggregating includes determining charging schedules a day ahead for each of the set of vehicle batteries of the EVs, and
    wherein the charging fairness of each EV is a weighted fairness,
    the method further comprising dynamically modifying the weighted fairness by dividing the weighted fairness associated with EVs of the set of EVs that exceed their scheduled charge by a constant factor in order to decrease the respective weighted fairness.

8. The method of claim 7, wherein the charging fairness is maintained by dynamically modifying a fairness value such that dispatch priority is increased among the set of EVs that have not reached their charging targets.

9. The method of claim 7, wherein the set of batteries are contained in plug-in electric vehicles that are plugged into charging stations, wherein the controlling includes sending the binary charging commands to a subset of the charging stations.

10. The method of claim 7, wherein the aggregating charging of the set of EVs includes sending the binary charging commands to the EVs in which it is determined that a change in charging rate is required.

11. The method of claim 10, wherein the determination that a change in charging rate is required is determined each time a regulation command signal is received.

12. The method of claim 11, wherein the regulation command signal is received in the range of every 2 to 6 seconds.

13. A non-transitory computer-readable storage medium storing computer-executable instructions that, in response to execution, cause a system including at least one processor to perform operations, comprising:

aggregating charging a set of batteries associated with an electric grid; and controlling switching of at least a subset of batteries of the set of batteries between an ON state and an OFF state at a given time by sending binary charge commands to the subset of batteries, in a manner that change of charging rate of individual batteries is minimized while maintaining charging fairness among the respective batteries in the set of batteries, wherein the aggregating charging of the set of batteries includes aggregating charging of a set of chargeable vehicle batteries contained in a respective set of electric vehicles (EVs), wherein the aggregating includes determining charging schedules a day ahead for each of the set of vehicle batteries of the EVs, and wherein the charging fairness of each EV is a weighted fairness, the operations further comprising dynamically modifying the weighted fairness by dividing the weighted fairness associated with EVs of the set of EVs that exceed their scheduled charge by a constant factor in order to decrease the respective weighted fairness.

* * * * *